United States Patent
Wolf

[15] 3,665,511
[45] May 23, 1972

[54] MAGNETIC DETECTION APPARATUS

[72] Inventor: John E. Wolf, Marengo, Ill.
[73] Assignee: Superior Continental Corporation, Hickory, N.C.
[22] Filed: Mar. 2, 1970
[21] Appl. No.: 15,556

[52] U.S. Cl. .................................340/258 D, 324/43
[51] Int. Cl. .........................................G08b 13/00
[58] Field of Search..............324/43, 47, 48; 340/258 D; 335/153, 151

[56] References Cited

UNITED STATES PATENTS 3,349,323  10/1967  Mullen.................................324/43
3,321,702  5/1967   Tuccinardi...........................324/43

Primary Examiner—John W. Caldwell
Assistant Examiner—Michael Slobasky
Attorney—Bair, Freeman & Molinare

[57] ABSTRACT

Detection apparatus for rapidly and accurately locating a hidden ferromagnetic object (such as a magnet buried in the earth to mark the location of underground equipment). The overlapping reeds in an evacuated reed switch capsule are set into motion by a fluctuating magnetic field. The strength of this fluctuating field is adjusted such that the two reeds nearly come into contact as they are deflected toward one another by the applied field. The presence of the additional, steady field created by a nearby ferrous object causes the reeds to actually make contact, thereby energizing a signalling device to indicate the location of the object.

3 Claims, 4 Drawing Figures

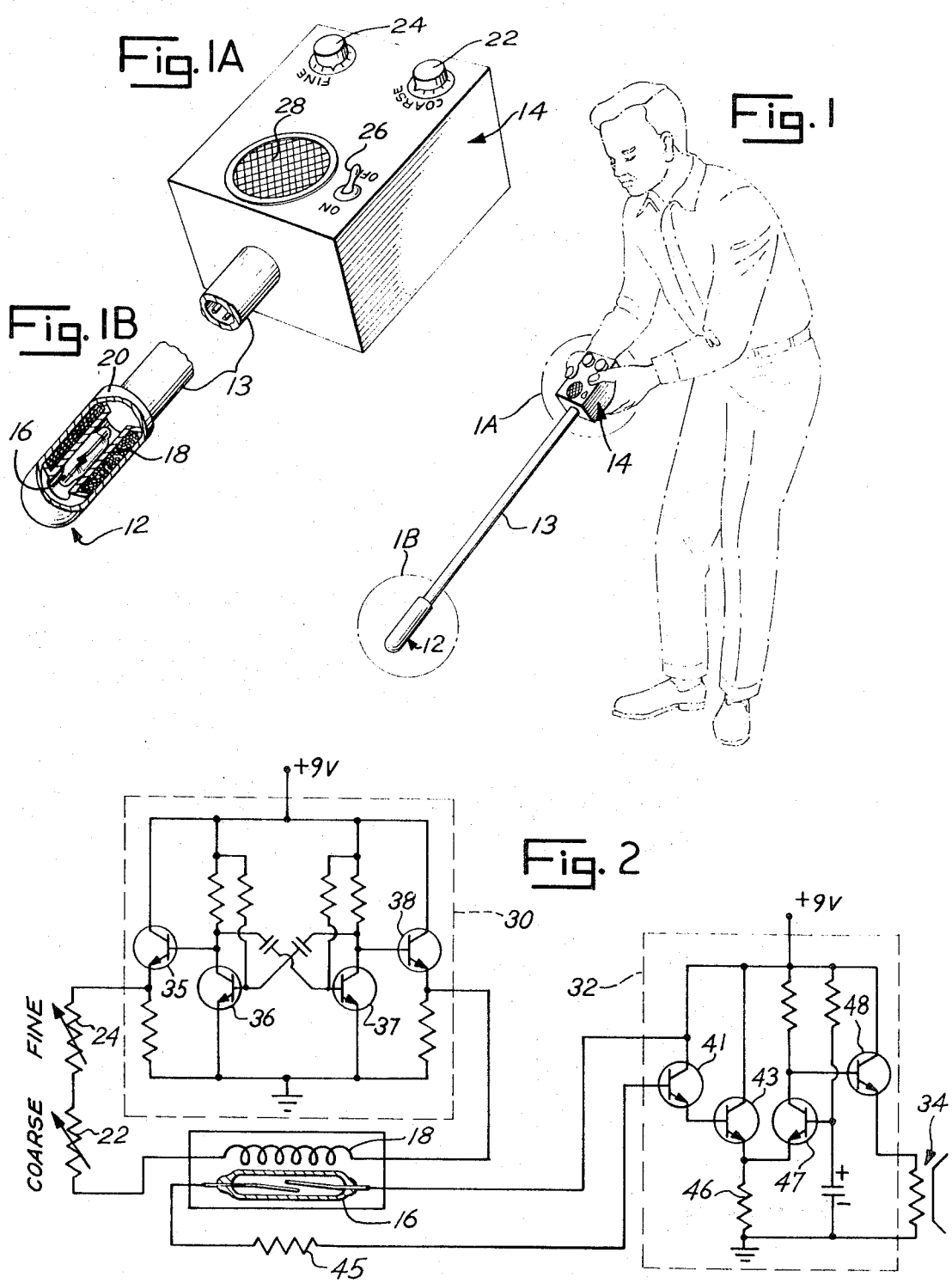

MAGNETIC DETECTION APPARATUS

BACKGROUND OF THE INVENTION

This invention relates generally to magnetic field responsive devices and, more particularly, to methods and apparatus for detecting the presence of ferromagnetic objects.

The present invention was developed in order to provide a simple yet highly effective device for precisely and rapidly locating buried objects which are either made of ferrous metal or whose location is marked by means of a magnet buried with the object. For example, the present invention may be used to quickly locate buried iron pipe, an electrical junction box which has been marked by means of a magnet before being buried in concrete, or a buried infantry mine made of ferrous material. Detection apparatus embodying the principle of the invention is characterized by its simplicity, versatility and ease of operation.

SUMMARY OF THE INVENTION

In a principal aspect, the present invention takes the form of a magnet field detecting device which includes, as its primary sensing element, a resilient, electrically conductive member which is set into motion by means of a source of a periodically fluctuating magnetic field. An electrical contact member is positioned adjacent the moving member such that the moving member very nearly engages the contact member during each cyclical movement. In the presence of a steady field (created, for example, by a magnetic object to be located), the moving member actually does engage the contact member, completing an electrical circuit and thereby providing an indication of the existence of the steady field.

The arrangement for producing the fluctuating field preferably includes means for adjusting the magnitude of that field. In this way, the fluctuating field may be gradually increased to that level just adequate to deflect the moving member into engagement with the contact member. Then the field intensity can be reduced slightly so that such contact ceases. In this way, maximum sensitivity to the existence of steady fields of the type produced by nearby magnetic objects may be obtained.

In addition, the ability to adjust the strength of the fluctuating field also provides the facility for decreasing the sensitivity of the device. Thus, once the general vicinity of the object to be located has been found, the sensitivity of the apparatus may be reduced so that the location of the object may be more precisely determined.

In accordance with a further feature of the invention, means are preferably employed for indicating the time duration during each cycle when the switch remains in the closed position — thus providing a direct indication of when the detector is being moved closer to (or farther from) the object to be located.

The two overlapping reeds in a conventional, evacuated reed switch capsule may be used as the sensing element, the applied fluctuating field serving to periodically deflect the two reeds toward one another. The fluctuating field may be obtained by connecting the output from a low-frequency solid state multivibrator to a magnetizing coil wound around the reed capsule.

BRIEF DESCRIPTION OF THE DRAWINGS

In the course of the detailed description which follows, frequent reference will be made to the attached drawings in which:

FIG. 1 is a pictorial view illustrating the exterior appearance of a magnet locating device which employs the principles of the present invention, as well as the manner in which it is used in the field;

FIG. 1A is an enlarged, perspective view of the hand-held control housing portion of the detecting device depicted in FIG. 1;

FIG. 1B is an enlarged, cutaway, perspective view of the sensing head for the detection device; and FIG. 2 is a schematic diagram of the circuitry employed in the preferred embodiment of the magnet locating device shown in FIG. 1.

DESCRIPTION OF THE PREFERRED EMBODIMENT

FIG. 1, together with the enlarged views of FIG. 1A and FIG. 1B, shows a magnet locating device which employs the principles of the present invention. The device includes a sensing head shown generally at 12 located at the end of an elongated rod 13 which extends from the control housing 14. As seen in the enlarged, cutaway view of FIG. 1B, a reed switch capsule 16 surrounded by a drive winding 18 is mounted within the sensing head 12.

The reed switch capsule 16 may be of a conventional design such as that disclosed in U.S. Pat. No. 2,289,830 which issued to W.B. Ellwood on July 14, 1942. Such a capsule commonly comprises a pair of resilient, electrically conductive reeds which are mounted cantilever fashion within an evacuated glass capsule such that the ends of the reeds overlap. The application of a longitudinally directed magnetic field causes the two reeds to deflect toward one another, the two reeds actually making contact upon the application of an adequately strong field.

The outer jacket 20 of the sensing head 12, as well as the hollow rod 13, is preferably made of a non-ferrous material which is lightweight, yet strong and durable (such as fiberglass or aluminum).

The control housing 14 encloses and protects the electronic circuitry for the magnet locating device and is equipped with "coarse" and "fine" sensitivity controls 22 and 24 respectively, as well as an ON-OFF power switch 26. In addition, a grill 28 covers the diaphragm of an annunciator (audible signal generator) which is also mounted within the control housing 14.

As depicted in FIG. 2, a detailed schematic drawing of the magnetic detection device, the reeds within the reed capsule 16 are set in motion by supplying a low frequency periodic signal to the drive winding 18 by means of a free running bistable electronic switch or "multivibrator" 30. Momentary closures of the reed switch 16 (created whenever the two reeds momentarily contact one another) are sensed and amplified by an electronic switching circuit 32 to produce an audible alarm generated by the annunciator 34.

The transistor multivibrator circuit 30 is of conventional design and comprises four transistors 35, 36, 37 and 38. The drive winding 18 is serially connected with the "coarse" and "fine" variable control resistors 22 and 24 between the emitters of transistors 35 and 38. When transistor 38 is conducting (and transistor 35 is nonconducting) current flows in a first direction through the winding 18. When transistor 38 switches OFF and transistor 35 is turned ON, the direction of current flow in the drive winding 18 is reversed. The individual reeds in the reed switch capsule 16 are set into periodic motion by the fluctuating field thus produced by the winding 18, the principal component of this motion being at twice the frequency at which the multivibrator 30 operates (the reeds are attracted toward one another regardless of which direction the magnetizing current is flowing through the drive winding 18).

The switching circuit 32 includes a pair of transistors 41 and 43 connected in a Darlington configuration; that is, the emitter of transistor 41 directly drives the base of transistor 43. The reed switch 16 is serially connected with a resistor 45 between the collector and base of the transistor 41. Upon even momentary contact between the two reeds in the capsule 16, forward bias is supplied to the base of transistor 41 through the resistor 45, turning ON both transistor 41 and transistor 43 and the voltage thus produced across the emitter resistor 46 turns OFF the formerly conducting transistor 47 to provide forward bias to the transistor 48. When transistor 48 is switched ON, power is supplied to the annunciator 34 to produce an audible signal.

For maximum sensitivity, the resistance of the "fine" control 24 may be first set to its minimum value. Thereafter, the resistance of the "coarse" control 22 may be slowly decreased until the time-varying field produced by the drive winding 18 is adequate to first cause periodic, brief contact between the reeds in the capsule 16 as indicated by a corresponding periodic audible signal produced by annunciator 34. The resistance of the "fine" control 24 is thereafter increased until the audible signal no longer appears. In this way, even the very weak additional magnetic field which is produced by the object to be located, causes the audible signal to reappear when the detector is brought into the vicinity of that object.

Once the general vicinity of the object to be located has been found, the sensitivity of the detection device can be decreased (by increasing the resistance of the coarse control 22) enabling the operator to thereafter search the immediate vicinity until the sound is once again produced by the annunciator. If necessary, the sensitivity may then be decreased still further in steps until the location of the desired object is pinpointed with precision.

As the strength of the local field increases, the duration of the reed switch closure (and hence the duration of each repeated tone from annunciator 34) increases. By holding the operating frequency of the multivibrator 30 to a low value, preferably below 10 cycles per second, this increase in the time duration of each closure is made apparent to the ear. Thus, the operator of the detecting apparatus is given a direct indication as he moves nearer to (or farther from) the object to be located.

It is to be understood that the embodiment of the invention which has been described is merely illustrative of one application of the principles of the invention. Numerous modifications may be made by those skilled in the art without departing from the true spirit and scope of the invention.

What is claimed is:

1. A method for indicating the presence of a local magnetic field having an intensity greater than a predetermined value, comprising the steps of:

subjecting a resilient ferrous member to a periodically fluctuating magnetic field to set said resilient member into reciprocating motion toward and away from a contact member adjacent to and normally spaced from said resilient member, indicating any actual engagement of said resilient member with said contact member resulting from the additional deflection force applied to said resilient member by said local magnetic field, first increasing the magnitude of said periodically fluctuating field to a level adequate to deflect said resilient member into periodic engagement with said contact member, and thereafter reducing the intensity of said fluctuating field to a level no longer adequate to deflect said resilient member whereby local fields of low intensity may be detected.

2. A method comprising the steps of:

fixedly holding an elongated, resilient, ferromagnetic electrically conductive member at one end whereby an opposing end of said resilient member is suspended in cantilever fashion adjacent to but normally spaced from said contact member, subjecting said resilient member to a periodic magnetic field such that said resilient member is cyclically deflected toward and away from said contact member, first increasing the magnitude of said periodically fluctuating field to a level adequate to deflect said resilient member into periodic engagement with said contact member, thereafter reducing the intensity of said fluctuating field to a level no longer adequate to deflect said resilient member into engagement with said contact member whereby said apparatus may be adjusted to detect local fields of low intensity, and indicating the presence of any additional magnetic field which additively co-acts with said periodic field to deflect said resilient member into engagement with said contact member in response to the completion of an electric circuit path through said resilient member and said contact member.

3. Detecting apparatus for indicating the presence of a local magnetic field having an intensity greater than a pre-determined value, said apparatus comprising in combination, a resilient ferrous member, a contact member positioned adjacent to and normally spaced from said resilient member, deflection means for subjecting said resilient member to a periodically fluctuating magnetic field to set said resilient member into reciprocating motion toward and away from said contact member, means for indicating the time duration during each cycle when said resilient member is in engagement with said contact member resulting from the additional deflection force applied to said resilient member by said local magnetic field, and control means for first increasing the magnitude of said periodically fluctuating field to a level adequate to deflect said resilient member into periodic engagement with said contact member and for thereafter reducing the intensity of said fluctuating field to a level no longer adequate to deflect said resilient member into engagement with said contact member whereby said apparatus may be adjusted to detect local fields of low intensity.

* * * * *